(No Model.)
W. X. STEVENS.
BICYCLE BRACE.
No. 293,284. Patented Feb. 12, 1884.
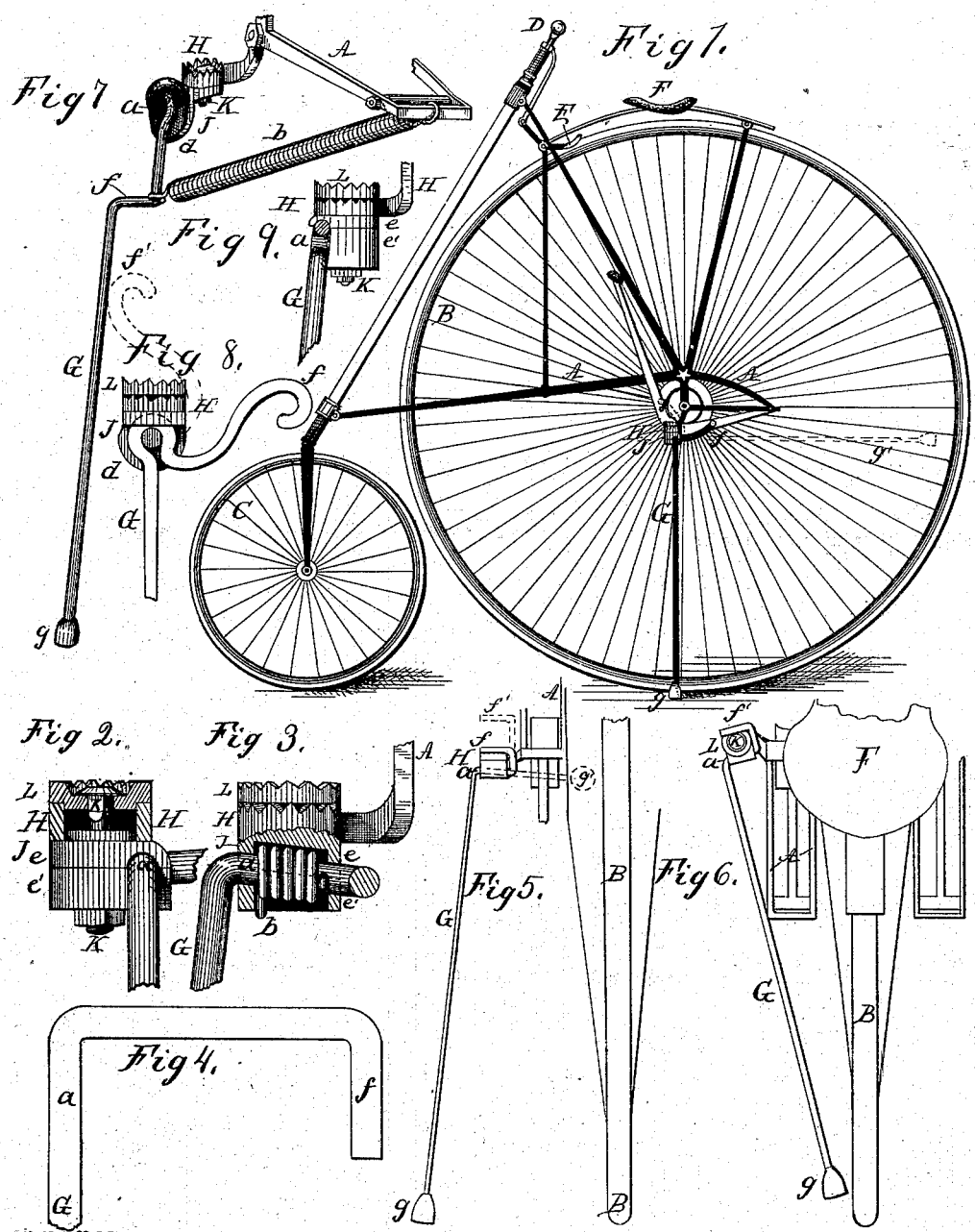
WITNESSES.
W. D. Egbert.
S. E. E. Stevens
INVENTOR
William X. Stevens.

UNITED STATES PATENT OFFICE.

WILLIAM X. STEVENS, OF WASHINGTON, DISTRICT OF COLUMBIA.

BICYCLE-BRACE.

SPECIFICATION forming part of Letters Patent No. 293,284, dated February 12, 1884.

Application filed January 2, 1884. (No model.)

*To all whom it may concern:*

Be it known that I, WILLIAM X. STEVENS, a citizen of the United States, residing at Washington, in the District of Columbia, have invented certain new and useful Improvements in Bicycle-Braces; and I do hereby declare the following to be a full, clear, and exact description of the invention, such as will enable others skilled in the art to which it appertains to make and use the same.

This invention relates to that class of bicycles in which a small guide-wheel is located in front of a large drive-wheel, and more particularly to that style known as the "American Star Bicycle."

The object of this invention is to provide means whereby a bicycle may be assisted to stand alone, or to stand while being mounted, or whereby it may be made to stand still by the rider seated thereon whenever he desires to stop and remain mounted, or whenever he desires to dismount.

The device which is the subject of this invention is adapted to be manufactured as an article of trade, to be attached to bicycles already in use, or to new bicycles at the factory.

The invention consists in a brace constructed to be hung to a bicycle and to be swung down to stand upon the ground, by a voluntary act of the rider, for the bicycle to lean upon, said brace to be held standing by the bicycle resting upon it, or by the rider's foot, and to be raised to its idle position and retained automatically when not so held, as hereinafter described and claimed, reference being had to the accompanying drawings, in which—

Figure 1 is a side elevation of a Star bicycle, showing my brace in service. Fig. 2 is a similar view of the bicycle-step, part in section, and a portion of my brace on a larger scale. Fig. 3 is a rear view, part in section, of the same. Fig. 4 is a plan view of one form of the top of the brace. Fig. 5 is a rear view of a portion of a bicycle, showing the brace in service. Fig. 6 is a plan view of a portion of a bicycle, showing the brace idle. Fig. 7 is a perspective view of a portion of a bicycle, showing a modification of my brace. Fig. 8 is a side elevation, and Fig. 9 is a rear elevation, part in section, of one form of my brace-hinge.

A represents the frame of a bicycle, B the drive-wheel, C the guide-wheel, D the guiding-handle, E the brake, F the saddle, and H the step, all of which may be in the common form.

G represents my brace, which, for sake of stiffness and neat appearance, I prefer to make of steel spring-tempered. This brace is hung to the bicycle by a joint, which I call a "hinge." The stationary portion J of this hinge may be secured to any suitable portion of the bicycle-frame; but I prefer to attach it removably to the step H.

The brace, when in use, stands with its foot $g$ upon the ground at some distance from the rim of the wheel B, preferably far enough to stand leaning or bracing toward the wheel, as in Fig. 5, and the brace should be of such length that, when so standing, it will allow the wheel B to lean slightly toward it, in order that the center of gravity of the bicycle may fall within the triangular base formed on the ground by the standing points of the two wheels and the brace, to cause the bicycle to stand alone. When idle, the brace G is in the position shown in Fig. 6, and by the dotted lines $g'$, Figs. 1 and 5. It is not positively necessary that the foot $g$ of the brace be carried in its idle position more than ten or twelve inches from the ground for safety in traveling; but it appears better when carried in a general line with the side of frame A, as shown in dotted lines $g'$, Fig. 1. It is necessary that the brace in its idle position be prevented from receiving the weight of the bicycle in case the latter falls over, for the brace or its hinge would be endangered thereby. I therefore so shape the hinge, or so hang the brace by the hinge and the lifting-spring $b$, that the foot $g$ will, as it rises from the ground, approach the wheel, and in its idle position be held close to the wheel, as shown in Fig. 6.

In wheeling the Star bicycle up and down stairs by hand, it is the common practice to tip it over backward, raising the guide-wheel high from the ground. In this position the foot of the idle brace would hit the ground and prevent progress if it projected beyond the rim of the wheel. Therefore, to carry the necessary length of brace within the diameter of the drive-wheel, I hinge the brace at or forward of the center of said wheel, and as far as possible from the vertical plane of the wheel. I then carry the brace, when idle, as before described, and shown in Fig. 6. Such a hinge as will guide the brace to the position of service and to the idle position described, I make by inclining the axis $a$ of the hinge from a horizontal line to a line preferably at a right angle to the body of the brace when standing leaning, (see Figs. 3 and 5,) and by inclining the same axis, $a$, relatively to the vertical plane of the wheel-axle, as shown in Fig. 6. I prefer this form of hinge, because the parts may be fitted closely and because they operate mechanically; but I may accomplish the same purpose in a more primitive and rough way by means of an eyebolt-hinge. (Shown in Fig. 7.) In the latter case a base, $d$, must be shaped to guide the brace away from the wheel as it swings to the ground, and a spring, $b$, must be so attached to the brace and to the frame A as to draw the brace up and in toward the wheel when free to act. For this purpose I attach one end of a spring, $b$, to the brace at a little distance from its hinge, and the other end to frame A at a point nearer to the wheel than its first attachment is, thus making it pull up and inward. This would result in forming a hinge with an inclined axis, as before described, for, to perform the action stated, the eye of the brace would be guided by the base $d$, to turn upon that portion of the stationary eye of the hinge which is inclined like the hinge-axis described. The top of the brace may be bent to form the axis $a$, as in Fig. 3; or it may be provided with an eye to fit on a fixed axis, as in Fig. 8.

To adapt my brace for attachment to the Star bicycles now in use, I shape the stationary part J of the hinge to fit the bicycle-step H, and I pass a screw-bolt, K, down through the step, which is a ring, and through the stationary part J of the hinge, and bolt the latter firmly to the former. The bolt-head may be made large enough to rest upon the step, but I prefer to use a common carriage-bolt, such as may be had at any hardware-store; and I interpose a washer, L, countersunk to admit the bolt-head below its surface, shaped on its under side to fit the step firmly, and roughened on top to serve as a step.

As a matter of economy in constructing the hinge, I may make the fixed portion J in two parts, $e\ e'$, that they may be separated to admit the corresponding part of the brace, and then be firmly bolted together by the same bolt, K, which holds them to the step. The hole in the step H being circular, the hinge may be set therein with its axis at any desired angle to the vertical plane of the drive-wheel axle, so that the foot of the brace may be swung to the wheel, even though the hinge-axis be horizontal; or the inclination of the axis toward a vertical line may be so steep as to bring the brace-foot to both positions $g$ and $g'$, Fig. 5.

To enable the rider to put the brace down at will, I provide it with an arm, $f$, which is at $f'$ when the brace is in its idle position. This, being directly over the step H, may be used by the rider as a step for mounting and dismounting in the old way.

To put the brace down, the rider places the middle of his foot on the end of the arm at $f'$ and carries it back down to $f$. When his toe rests upon step L, he may know, without looking, that the brace is in position to stand. He then applies the brake to hold the wheel still, and turns the guide-wheel away from the side that the brace is on, when the bicycle will be thrown off its balance and lean upon the brace. Now, the rider may mount and sit on the saddle as long as he pleases to keep still. When he wishes to start the bicycle, he should deliberately place both feet upon the treadles, then turn the guide-wheel straight ahead, and quickly throw his weight upon the treadles. This will easily start him, even upon rising ground, and the instant the bicycle stands erect the brace will be raised to its idle position by the spring $b$ automatically, and it will be so held by said spring until again required for use.

To stop the bicycle and keep still, the rider has only to put the brace down, put on the brake, and turn the guide-wheel as before described, when the bicycle will be stopped and will be held up by the brace. The rider may now sit and rest, or dismount at his leisure.

In the modification shown in Fig. 7 the arm $f$ is directly in the body of the brace, and may serve, as before, to get up and down upon and to put the brace down by; but it never rises above the fixed step H, as at $f'$; yet if the brace be hung at some point back of the step, as upon the end of the drive-wheel axle, the foot may rest upon the regular step H and upon arm $f$ at the same time. However this may be effected, it is a matter of much importance to be able to so rest the foot upon the step while holding the brace down, as it enables the rider not only to know that he has the brace in position to be trusted before he stops the bicycle, but it enables him to so hold the brace with certainty while seeking a suitable place to dismount.

The brace may be provided with a stop to prevent it being pushed too far forward; but my experience leads me to think that the brace works best to be thrown a little forward of a vertical line when stopping quickly, as then it may give a little to the rider's momentum, and so arrive at a vertical position fore and aft when fully stopped.

Should it be found practicable to inclose a spring of sufficient strength to lift and support the brace, as described, within so small a space, I prefer a spiral spring, $b$, Fig. 3, coiled around the hinge-axis, with one end fixed and the other end acting constantly upon the brace to lift it. Any portion of a bicycle which will serve to rest the foot upon or against while holding the brace down would answer the purpose of the step in this respect.

The spring $b$ may be substituted by a balance-weight, which will draw the brace up and hold it automatically; but I prefer the spring as lighter, quicker working, and less complicated.

What I claim as my invention, and wish to secure by Letters Patent, is—

1. The combination, with a brace and a hinge, of a spring or its equivalent, adapted to lift and support said brace, substantially as shown and described.

2. The combination, with a bicycle, of a brace hung thereto by a hinge, and a spring or its equivalent, adapted to raise and support said brace, as shown and described.

3. The combination, with a bicycle, a brace, and a spring, of a hinge having an inclined axis, substantially as and for the purpose specified.

4. The combination, with a bicycle and a brace, of a hinge, constructed substantially as described, whereby the foot of the brace in rising from the ground will be guided toward the wheel, as specified.

5. The combination, with a bicycle-brace, of a hinge and means for removably attaching the same to the step of a bicycle, substantially as and for the purpose specified.

6. The combination, with a bicycle having a step, of a brace, a hinge, and means for removably attaching the same to the step of the bicycle, substantially as and for the purpose specified.

7. The combination, with a bicycle having a fixed portion, upon which the rider's foot may rest, of a brace having an arm, substantially as described, whereby the rider's foot may rest upon said fixed portion while holding the brace down, as and for the purpose specified.

8. The combination, with a bicycle, of a brace and an arm on said brace, whereby the brace may be put down by the rider's foot, and whereby the said foot may rest upon both the bicycle-step and upon the said arm when the brace is down, as and for the purpose specified.

9. The combination, with a bicycle-brace, of a hinge therefor, fitted to engage the step of a bicycle, and a screw-bolt fitted for removably securing the hinge to the step, substantially as and for the purpose specified.

10. The combination, with a bicycle having a step, a brace having a hinge fitted to engage said step, and a screw-bolt therefor, of a washer countersunk to receive the bolt-head, and roughened to serve as a step, substantially as and for the purpose specified.

11. The combination, with a bicycle having a step, of a brace and means for securing the brace to the step, substantially as and for the purpose specified.

In testimony whereof I affix my signature in presence of two witnesses.

WILLIAM X. STEVENS.

Witnesses:
 W. D. EGBERT,
 S. E. E. STEVENS.